United States Patent
Hoshino et al.

(10) Patent No.: US 9,806,866 B2
(45) Date of Patent: *Oct. 31, 2017

(54) WIRELESS COMMUNICATION TERMINAL DEVICE, WIRELESS COMMUNICATION BASE DEVICE, AND METHOD FOR GENERATING CSI

(71) Applicant: Sun Patent Trust, New York, NY (US)

(72) Inventors: Masayuki Hoshino, Kanagawa (JP); Akihiko Nishio, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/354,128

(22) Filed: Nov. 17, 2016

(65) Prior Publication Data
US 2017/0070331 A1 Mar. 9, 2017

Related U.S. Application Data

(63) Continuation of application No. 14/415,125, filed as application No. PCT/JP2013/004198 on Jul. 5, 2013, now Pat. No. 9,531,518.

(30) Foreign Application Priority Data

Aug. 3, 2012 (JP) ................................. 2012-173036

(51) Int. Cl.
*H04L 5/00* (2006.01)
*H04B 7/06* (2006.01)
(Continued)

(52) U.S. Cl.
CPC .......... *H04L 5/0053* (2013.01); *H04B 7/024* (2013.01); *H04B 7/0626* (2013.01); *H04B 17/24* (2015.01);
(Continued)

(58) Field of Classification Search
CPC .... H04B 17/24; H04B 17/309; H04B 17/318; H04B 17/345; H04B 7/024; H04B 7/0626;
(Continued)

(56) References Cited

U.S. PATENT DOCUMENTS 8,611,243 B2 * 12/2013 Ko .................. H04B 7/0486
370/248
8,868,089 B2 * 10/2014 Lindbom .............. H04L 5/00
370/252
(Continued)

FOREIGN PATENT DOCUMENTS

EP 2 642 674 A2 9/2013
JP 2008-67121 A 3/2008
(Continued)

OTHER PUBLICATIONS

Extended European Search Report dated Jul. 9, 2015, for corresponding EP Application No. 13824923.0-1852 / 2882217, 7 pages.
(Continued)

*Primary Examiner* — Warner Wong
(74) *Attorney, Agent, or Firm* — Seed IP Law Group LLP

(57) ABSTRACT

The purpose of the present invention is to be able to simultaneously generate three or more sets of CSI within a predetermined time interval, without degrading the accuracy of the CSI, to achieve CoMP control for flexible switching of base stations. At predetermined intervals or at timing coincident with reception of trigger information, a generation unit uses a CSI-RS resource to measure a desired signal component and interference component, and generate CSI. A transmission unit transmits control information including the CSI. During a given interval (for example, during four sub-frames) following reception of trigger information, the generation unit does not measure the interference compo-
(Continued)

nent, instead using the most recent previously measured interference component, to measure the channel quality.

6 Claims, 9 Drawing Sheets

(51) Int. Cl.
    H04B 7/024      (2017.01)
    H04B 17/24     (2015.01)
    H04B 17/309    (2015.01)
    H04B 17/318    (2015.01)
    H04B 17/345    (2015.01)
    H04B 17/40     (2015.01)

(52) U.S. Cl.
    CPC ......... H04B 17/309 (2015.01); H04B 17/318 (2015.01); H04B 17/345 (2015.01); H04L 5/0057 (2013.01); H04L 5/0094 (2013.01); H04B 17/404 (2015.01); H04L 5/0035 (2013.01)

(58) Field of Classification Search
    CPC ... H04L 5/0035; H04L 5/0053; H04L 5/0057; H04L 5/0094
    See application file for complete search history.

(56) References Cited

U.S. PATENT DOCUMENTS

| | | | | |
|---|---|---|---|---|
| 8,917,665 | B2* | 12/2014 | Seo | H04L 1/0026 370/328 |
| 9,100,868 | B2* | 8/2015 | Pedersen | H04W 24/10 |
| 9,106,386 | B2* | 8/2015 | Etemad | H04W 24/04 |
| 9,124,330 | B2* | 9/2015 | Lee | H04B 7/0632 |
| 9,209,933 | B2* | 12/2015 | Damnjanovic | H04L 1/0026 |
| 9,253,659 | B2* | 2/2016 | Jeong | H04W 24/10 |
| 9,264,120 | B2* | 2/2016 | Jongren | H04L 1/0026 |
| 9,391,736 | B2* | 7/2016 | Nayeb Nazar | H04L 1/0027 |
| 9,491,648 | B2* | 11/2016 | Choi | H04L 5/0057 |
| 9,591,499 | B2* | 3/2017 | Comsa | H04W 24/10 |
| 9,602,183 | B2* | 3/2017 | Kim | H04B 7/0626 |
| 9,621,318 | B2* | 4/2017 | Lee | H04B 7/024 |
| 9,673,945 | B2* | 6/2017 | Geirhofer | H04L 5/0048 |
| 2010/0188969 | A1 | 7/2010 | Kim et al. | |
| 2011/0199986 | A1 | 8/2011 | Fong et al. | |
| 2012/0076017 | A1 | 3/2012 | Luo et al. | |
| 2012/0076040 | A1 | 3/2012 | Hoshino et al. | |
| 2012/0082049 | A1 | 4/2012 | Chen et al. | |
| 2012/0177018 | A1 | 7/2012 | Abraham et al. | |
| 2012/0208547 | A1 | 8/2012 | Geirhofer et al. | |
| 2013/0028182 | A1 | 1/2013 | Geirhofer et al. | |
| 2013/0121270 | A1 | 5/2013 | Chen et al. | |
| 2013/0196675 | A1 | 8/2013 | Xiao et al. | |
| 2013/0235756 | A1 | 9/2013 | Seo et al. | |
| 2013/0242902 | A1 | 9/2013 | Liu et al. | |
| 2013/0301448 | A1 | 11/2013 | Sayana et al. | |
| 2013/0301450 | A1 | 11/2013 | Geirhofer et al. | |
| 2014/0038623 | A1 | 2/2014 | Davydov et al. | |
| 2014/0078919 | A1 | 3/2014 | Hammarwall | |
| 2014/0126476 | A1 | 5/2014 | Kang et al. | |
| 2014/0177601 | A1* | 6/2014 | Nishio | H04W 24/10 370/332 |
| 2014/0321407 | A1 | 10/2014 | Seo et al. | |

FOREIGN PATENT DOCUMENTS

| | | |
|---|---|---|
| JP | 2012-516609 A | 7/2012 |
| WO | 2011/100520 A1 | 8/2011 |
| WO | 2012/067442 A2 | 5/2012 |

OTHER PUBLICATIONS

International Search Report dated Sep. 10, 2013, for corresponding International Application No. PCT/JP2013/004198, 4 pages.
Renesas Mobile Europe Ltd., "On CSI feedback processing complexity in CoMP," R1-122350, 3GPP TSG-RAN WG1 Meeting #69, Agenda Item: 7.5.1.1, Prague, Czech Republic, May 21-25, 2012, 5 pages.
English Translation of Taiwanese Search Report, dated Oct. 26, 2016, for corresponding TW Application No. 102125084, 1 page.

* cited by examiner

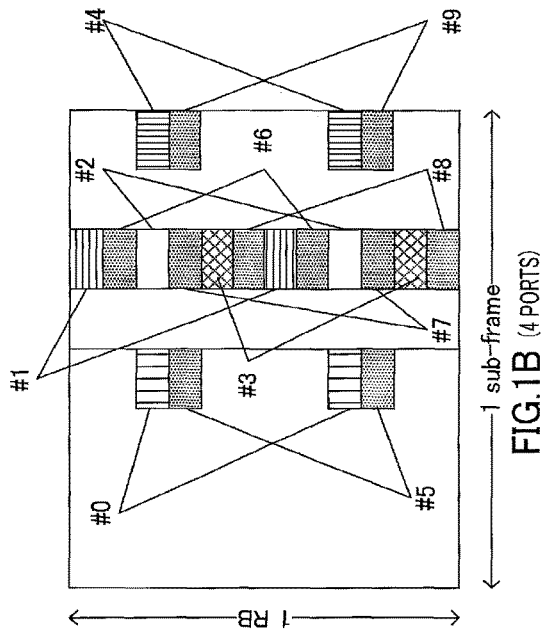
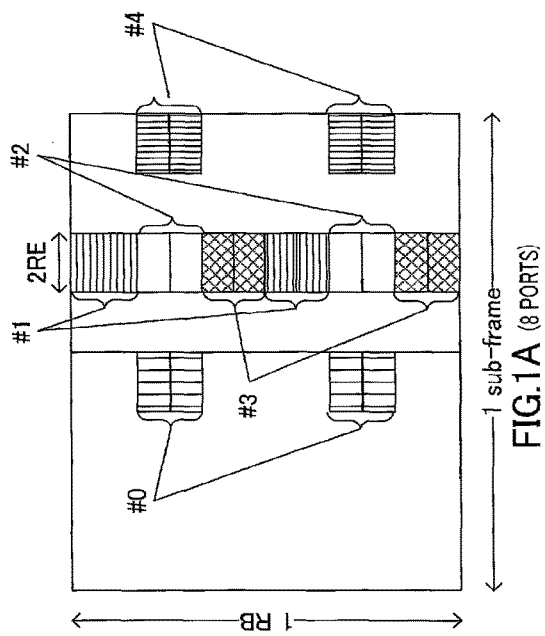
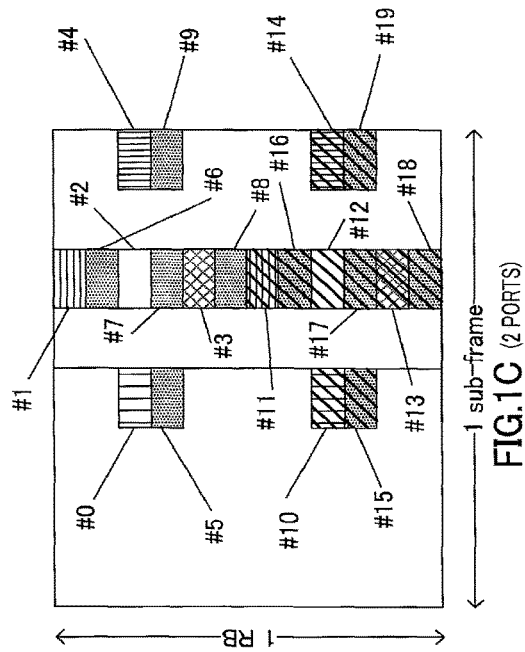

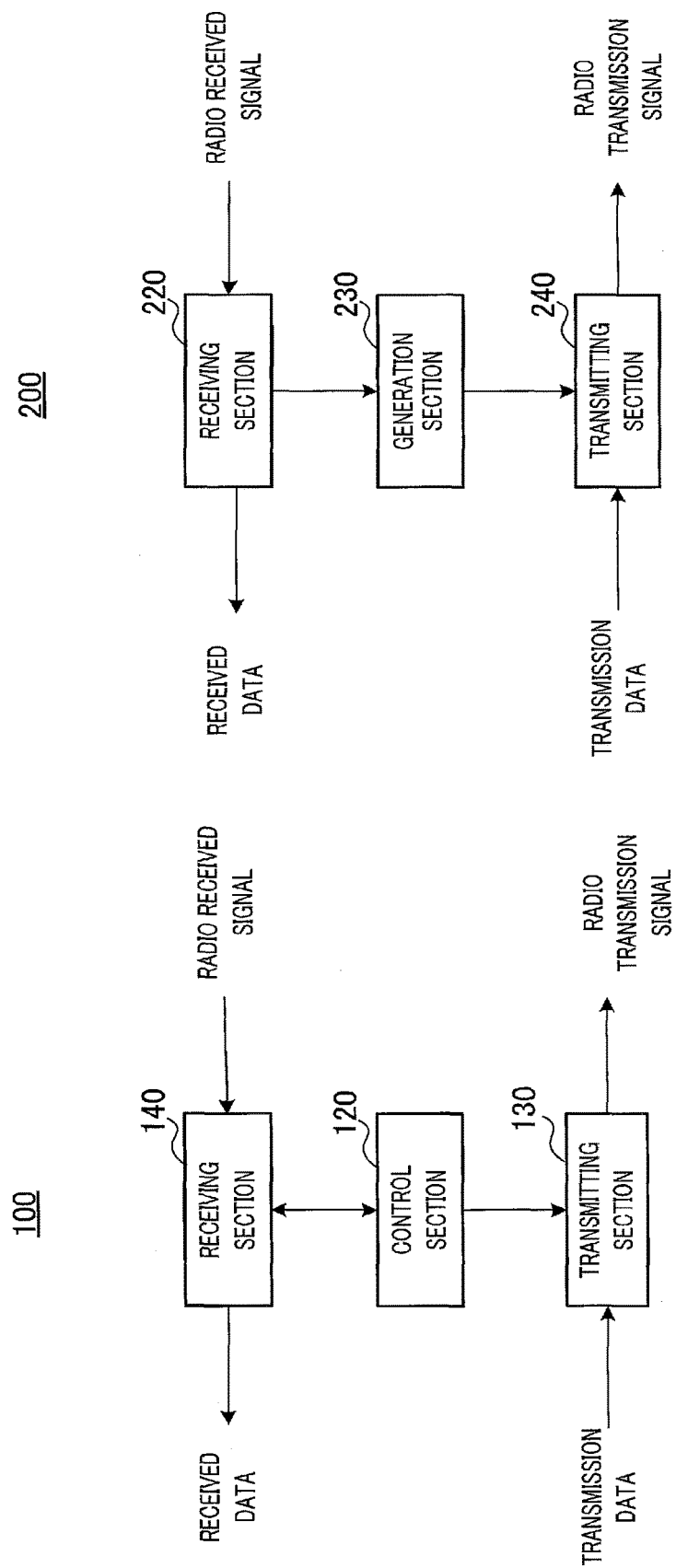

WIRELESS COMMUNICATION TERMINAL DEVICE, WIRELESS COMMUNICATION BASE DEVICE, AND METHOD FOR GENERATING CSI

TECHNICAL FIELD

The present invention relates to a radio communication terminal apparatus, a radio communication base station apparatus, and a CSI generating method, which are compliant with LTE-Advanced.

BACKGROUND ART

[CSI Generation and Reporting Operation]

In order to realize high-speed and large capacity communication between a radio communication base station apparatus (hereinafter, abbreviated as "base station") and a radio communication terminal apparatus (hereinafter, abbreviated as "terminal (UE: User Equipment)"), 3GPP (3rd Generation Partnership Project) has standardized LTE (Long Term Evolution) and LTE-Advanced (hereinafter, abbreviated as "LTE-A"), and is currently carrying out the standardization for further enhancement.

LTE and LTE-A adopt OFDMA (Orthogonal Frequency Division Multiple Access) as a downlink communication scheme and adopt SC-FDMA (Single Carrier Frequency Division Multiple Access) as an uplink communication scheme.

For frequency scheduling and link adaptation in OFDMA, a base station instructs each terminal to report CSI (Channel State Information) and allocates appropriate resources using CSI. CSI is information including downlink channel quality (SINR or the like) measured using a desired signal component and an interference component. CSI includes CQI (Channel Quality Indicator), PMI (Precoding Matrix Indicator) and RI (Rank Indicator) which indicates a spatial multiplexing number.

LTE introduces two operations: operation of periodically reporting CSI (hereinafter referred to as "periodic reporting") and operation of aperiodically reporting CSI (hereinafter referred to as "aperiodic reporting"). In periodic reporting, a terminal reports CSI by arranging the CSI on an uplink control channel which is a defined uplink resource at predetermined intervals. On the other hand, in aperiodic reporting, a terminal reports CSI using a resource on a common data channel at predetermined timing after receiving an instruction (or request) to report CSI from a base station. Aperiodic reporting is instructed to the terminal when an uplink data channel is allocated using downlink control channel PDCCH.

The terminal performs one measurement operation indicated in advance from the base station out of a plurality of measurement operations in one of periodic reporting and aperiodic reporting. This measurement operation is indicated from the base station to the terminal using a message for radio resource control (RRC signaling). Note that the base station can indicate different measurement operations for periodic reporting and aperiodic reporting to the terminal. For example, the base station may instruct the terminal to perform measurement operation to report RI, wideband PMI and wideband CQI in periodic reporting, and may instruct the terminal to perform measurement operation to report RI, wideband PMI, narrow band CQI in aperiodic reporting. In this case, periodic reporting may be used for rough link adaptation which is referenced when transmitting data with low urgency and aperiodic reporting may be used for detailed link adaptation which is referenced when transmitting data with high urgency.

The terminal measures channel quality of a measurement target indicated in advance from the base station and reports CSI. LTE-A Release10 has added an operation for a terminal to report CSI for two types of measurement targets indicated in advance in periodic reporting. In addition, LTE-A Release10 has added an operation for a terminal to associate two types of measurement targets indicated in advance with timing at which a base station instructs the terminal to report CSI and for the terminal to report CSI for one of the measurement targets in aperiodic reporting. The two types of measurement targets have different situations of interference components. The two types of measurement targets are indicated to the terminal from the base station using RRC with a bitmap corresponding to 40 continuous subframes.

LTE-A Release10 also has introduced a concept of CA (Carrier Aggregation) and increased the number of bits of trigger information (CSI request field) indicating aperiodic reporting from 1 bit to 2 bits. As a result, the base station is enabled to instruct the terminal to report CSI and report one of a plurality of CCs (Component Carriers) or a plurality of CSIs as the CSI to be reported by the terminal. For example, the base station indicates CSIs of two CCs as CSI1 and CSI2 using bits of trigger information, "00" indicating that "CSI is not reported," "01" indicating that "only CSI1 is reported," "10" indicating that "only CSI2 is reported" and "11" indicating that "CSI1 and CSI2 are reported" in advance through, for example, RRC signaling. The base station then transmits trigger information with one of the above-described combinations of bits to the terminal, and can thereby indicate aperiodic reporting and also indicate CSI to be reported.

Thus, LTE-A Release10 provides a mechanism of simultaneously reporting two CSIs with the introduction of CA. To put it more specifically, in aperiodic reporting, the terminal transmits two CSIs using an uplink data signal after a lapse of a predetermined time (4 subframes) after reception of CSI reporting from the base station.

[Coordinated Transmission by Plurality of Base Stations (CoMP)]

Meanwhile, in Release 11, which is the next version of LTE-A, CoMP (Coordinated Multi-Point) is being studied whereby a plurality of base stations cooperate to transmit signals to a terminal in a heterogeneous cell network (HetNet: Heterogeneous Network) in which there are a plurality of base stations having cover areas of different scales. HetNet is constructed of a macro cell (cell formed of a base station having large transmission power and coverage) and a pico cell (cell formed of a base station having small transmission power and coverage) within the macro cell. CoMP can reduce inter-cell interference and increase system throughput.

As CoMP schemes, 3GPP is studying mainly two CoMP schemes: (1) Coordinated beamforming (CB) and (2) Joint Transmission (JT).

CB assumes that data transmitted to a predetermined terminal is possessed by only one cell. In the case of CB, a terminal regards as interference, signals transmitted from a base station of a neighboring cell that possesses no data addressed to the terminal. CB adopts a technique of reducing inter-cell interference by controlling transmission parameters. Examples of specific transmission parameters include precoding, transmission power, modulation scheme and coding rate. By appropriately controlling these parameters, it is possible to weaken signals from the interfering cell addressed to the corresponding terminal while strengthening signals from a desired cell.

On the other hand, JT assumes that data transmitted to a predetermined terminal is possessed by a plurality of cells. Therefore, according to JT, respective base stations of the plurality of cells can simultaneously transmit signals to the corresponding terminal. Thus, unlike a conventional system, the terminal can handle a signal from a neighboring cell not as interference but as a desired signal, and therefore an SINR measured in the terminal is expected to improve. Especially by devising a method of generating precoding weights in a plurality of cells as operation within a network, it is possible to significantly improve the SINR measured in the terminal.

For CoMP control, LTE-A Release 11 provides a technique whereby a terminal measures channel quality of downlink to be controlled between a base station (hereinafter referred to as "coordinating base station") of each cell and the terminal, and reports CSI to the coordinating base stations in cell units. To put it more specifically, in aperiodic reporting, the terminal transmits the same number of CSIs as the coordinating base stations using uplink data signals after a lapse of a predetermined time after reception of an instruction of CSI reporting from the coordinating base station.

[Reference Signal]

According to LTE-A Release11, a base station can indicate in advance, to a terminal, a resource to be measured to which a reference signal is mapped. As a reference signal, CSI-RS (Channel State Information-Reference Signal) is used. The base station indicates, to the terminal, information on a CSI-RS including a resource to which the CSI-RS is mapped using a message for radio resource control (RRC signaling) before the terminal performs CSI reporting.

FIGS. 1A to 1C are diagrams illustrating configuration examples of resources to which CSI-RSs are mapped. CSI-RSs are defined in 8-port, 4-port and 2-port configurations respectively according to the number of transmitting antenna ports of the base station. FIG. 1A illustrates a configuration example when the number of antenna ports is 8, FIG. 1B illustrates a configuration example when the number of antenna ports is 4, and FIG. 1C illustrates a configuration example when the number of antenna ports is 2. In FIGS. 1A to 1C, one subframe is made up of two resource blocks (RBs) each bundling 12 subcarriers. In FIGS. 1A to 1C, #i (0 to 19) represents a resource (2 REs (Resource Elements)) of two continuous OFDM symbols in the time domain within each subcarrier. In each resource (2 REs), CSI-RSs corresponding to two ports are code-multiplexed.

Each terminal acquires CSI-RS-related information from the base station in advance. Examples of the CSI-RS-related information include the number of antenna ports (Antenna Ports Count), CSI-RS configuration number (Resource Config: number #0 in FIG. 1 or the like) that identifies subcarriers within a subframe to which CSI-RS is mapped and OFDM symbol position, transmission subframe (Subframe Config) made up of transmission cycle and offset, and power ratio (p-C) between reference signals and data signals.

In FIGS. 1A to 1C, CSI-RS configuration numbers are assigned in order in the time direction and in order in the frequency direction at the same point in time. As shown in FIGS. 1A to 1C, the same number is assigned to the start position (start position in numbering order) of a resource of each CSI-RS configuration number among CSI-RS configurations corresponding to the respective numbers of antenna ports. As shown in FIGS. 1A to 1C, a CSI-RS configuration with a small number of antenna ports forms a subset of a CSI-RS configuration with a large number of antenna ports. The same number is assigned to resources with the same start position. This makes it possible to cover all resources to be identified with minimum necessary numbers for each number of ports while using overlapping numbers. For example, CSI-RS config(0) with 2 ports shown in FIG. 1C can be identified as only resources (2 REs) corresponding to two ports from the start position of CSI-RS config(0) (8 REs) with 8 ports shown in FIG. 1A. Resources indicated in this way are resources used to measure desired signal components (hereinafter referred to as "desired signal component measurement resources") and called "non zero power CSI-RS resources."

LTE-A Release11 also provides a muting technique that causes a coordinating base station in a connected cell to transmit a no transmission signal (signal with amplitude 0) to measure CSI-RS transmitted from a coordinating base station in a peripheral cell. To put it more specifically, of resources with configuration numbers #0 to #9 corresponding to four ports, resources to be designated as no transmission signals (resources to be muted) are indicated using a bitmap. Hereinafter, information indicating resources to be designated as no transmission signals will be referred to as "no transmission CSI-RS configuration number list (zeroTxPowerResourceConfigList)."

As an example, when configuration numbers (Resource Config) #1 and #2 are assumed to be no transmission signals, a no transmission CSI-RS configuration number list becomes {0, 1, 1, 0, 0, 0, 0, 0, 0, 0}. The base station indicates this no transmission CSI-RS configuration number list together with a transmission subframe (zeroTxPowerSubframeConfig) made up of a transmission cycle and offset to the terminal as in the case of the aforementioned CSI-RS, and the terminal can thereby identify resources which become no transmission signals in the corresponding subframe. The positions of the no transmission signals in the subframe corresponding to this example are #1 and #2 of CSI-RS shown in FIG. 2.

By associating a CSI-RS configuration of a coordinating base station of a peripheral cell with one CSI-RS configuration in the no transmission CSI-RS configuration number list, it is possible to avoid interference of a signal from the coordinating base station of the connected cell when measuring an SINR using the signal from the coordinating base station of the corresponding peripheral cell as a desired signal, and thereby improve accuracy of measuring CSI in the terminal. The resources indicated in this way are resources used to measure an interference component (hereinafter referred to as "interference component measurement resources") and are called "zero power CSI-RS resources."

Each resource of CSI-RS is used to measure one of a desired signal component and an interference component for one CSI report. The base station may indicate only a non zero power CSI-RS resource, indicate only a zero power CSI-RS resource or indicate a combination of a non zero power CSI-RS resource and a zero power CSI-RS resource. Note that the base station may instruct the terminal to use resources used to measure a desired signal component in one CSI report to also measure an interference component in another CSI report.

[Number of CSI Reports]

As described above, LTE-A Release10 provides the mechanism for simultaneously reporting two CSIs. On the other hand, a terminal simultaneously reports a plurality of CSIs to realize CoMP in LTE-A Release11 as well. In LTE-A Release11, unlike LTE-A Release10, the number of CSIs simultaneously generated is not limited to 2. For example, a base station of a macro cell, as a base station corresponding to a desired signal component, causes a terminal located in the vicinity of two pico cells within the macro cell area to measure SINRs of signals transmitted from three cells: a macro cell (TP-a), pico cell 1 (TP-b) and pico cell 2 (TP-c) and report the three CSIs. Thus, it is possible to transmit a signal from a base station having the best channel quality among the three cells, and thereby realize data transmission of high quality.

However, as the number of simultaneously reported CSIs increases, the amount of processing required to generate CSI for updating the information thereof increases. For example, in the case where the terminal is caused to simultaneously report three CSIs, the amount of processing required to generate CSIs becomes at least 1.5 times compared to a case where two CSIs are simultaneously generated. For this reason, the terminal may not be able to complete processing of CSI reporting within a predetermined time (4 subframes) in aperiodic reporting. Thus, a technique for handling this increase in the amount of processing is necessary.

A first conventional technique for handling the increase in the amount of processing may be to limit to a maximum of 2, the number of CSIs to be reported in one reporting unit of aperiodic reporting which is indicated by the base station using RRC signaling. It is thereby possible to make the amount of processing required to generate CSI equivalent to that in the related art.

Moreover, as a second conventional technique for handling the increase in the amount of processing may be to lessen the allowable value of the processing time (see NPL 1). To put it more specifically, although CSI is conventionally reported after a lapse of 4 subframes after reception of an instruction of CSI reporting, CSI may be reported after a lapse of 6 subframes. This makes it possible to complete processing of CSI reporting without increasing the amount of processing per unit time.

CITATION LIST

Non-Patent Literature

NPL 1
R1-122350, Renesas Mobile Europe Ltd., "On CSI feedback processing complexity in CoMP"

SUMMARY OF INVENTION

Technical Problem

However, according to the above-described first technique, the reporting operation is limited to a set value by RRC signaling, and so a base station as a reporting target can be switched only about one time every several seconds, which means that CSI is set quasi-statically, which diminishes the effect of CoMP that switching between base stations can be performed flexibly at intervals of several ms.

According to the above-described second technique, the time from an instruction of CSI reporting to actual CSI reporting is extended. According to the above-described second technique, timing of CSI reporting is different between a Release10 compliant terminal and a Release11 compliant terminal, and therefore scheduling in the base station becomes complicated.

An object of the present invention is to provide a radio communication terminal apparatus, a radio communication base station apparatus and a CSI generating method capable of generating a plurality of CSIs within a period defined in Release10 without deteriorating accuracy of CSI and realizing CoMP control whereby switching between base stations can be performed flexibly.

Solution to Problem

As described above, a radio communication terminal apparatus according to an aspect of the present invention includes: a generation section that generates CSI (Channel State Information) using a desired signal component and an interference component; and a transmitting section that transmits the CSI, in which when receiving trigger information that requests a CSI report and generating the CSI, the generation section uses an interference component measured before receiving the trigger information.

A radio communication base station apparatus according to an aspect of the present invention includes: a transmitting section that transmits resource information indicating a resource to which a reference signal is mapped and trigger information requesting a CSI report; and a receiving section that receives CSI (Channel State Information) generated based on a desired signal component and an interference component measured using the resource for the trigger information, in which the CSI is generated based on an interference component measured before transmitting the trigger information.

A CSI generating method according to an aspect of the present invention includes: measuring a desired signal component and an interference component; and generating CSI (Channel State Information) using the desired signal component and the interference component, in which, when trigger information requesting a CSI report is received and the CSI is generated, an interference component measured before receiving the trigger information is used.

Advantageous Effects of Invention

According to the present invention, it is possible to generate a plurality of CSIs within a period defined in Release10 without deteriorating accuracy of CSI and realize CoMP control whereby switching between base stations can be performed flexibly.

BRIEF DESCRIPTION OF DRAWINGS

FIGS. 1A to 1C illustrate configuration examples of CSI-RS resources;

FIG. 3 is a block diagram illustrating a main configuration of a base station according to Embodiment 1 of the present invention;

FIG. 4 is a block diagram illustrating a main configuration of a terminal according to Embodiment 1 of the present invention;

DESCRIPTION OF EMBODIMENTS

Since a desired signal component follows instantaneous variations such that narrow band signals corresponding to subband CQI or the like tend to have lower time correlation or that it is necessary to observe a complex signal component for PMI calculation according to an instantaneous fading value, the desired signal component has a small allowable delay. On the other hand, since an interference component follows shadowing and traffic load such as an average power value of components that can be received as interference, the interference component has a large allowable delay. In this way, allowable control delays vary depending on the nature of channel information.

Focusing attention on this aspect, the present invention is based on a concept that regarding an interference component, the accuracy of CSI would not significantly deteriorate even by using values measured in advance for resources transmitted in the past corresponding to one to several transmissions at CSI-RS transmission intervals.

Hereinafter, embodiments of the present invention will be described in detail with reference to the accompanying drawings.

Embodiment 1

[System Configuration]

Figure 2:
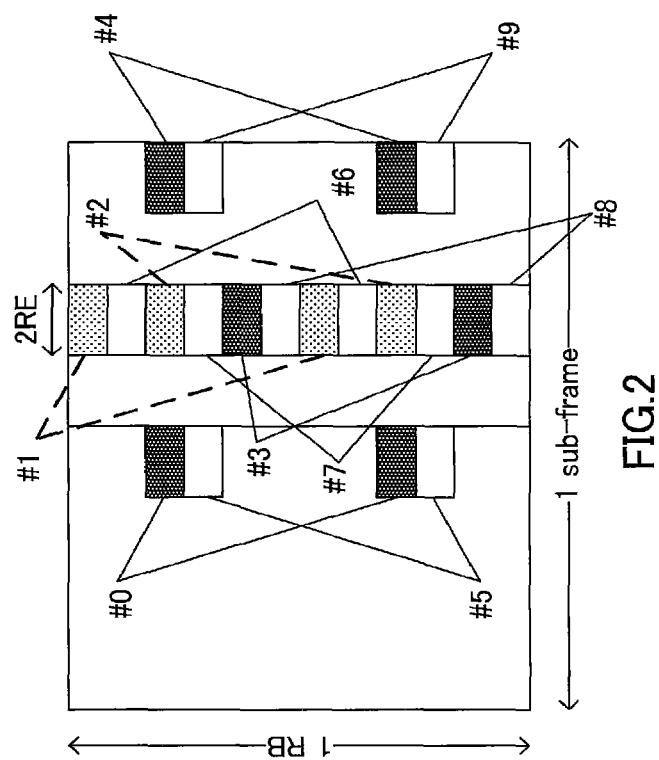
FIG. 2 illustrates a configuration example of CSI-RS resources.
Figure 5:
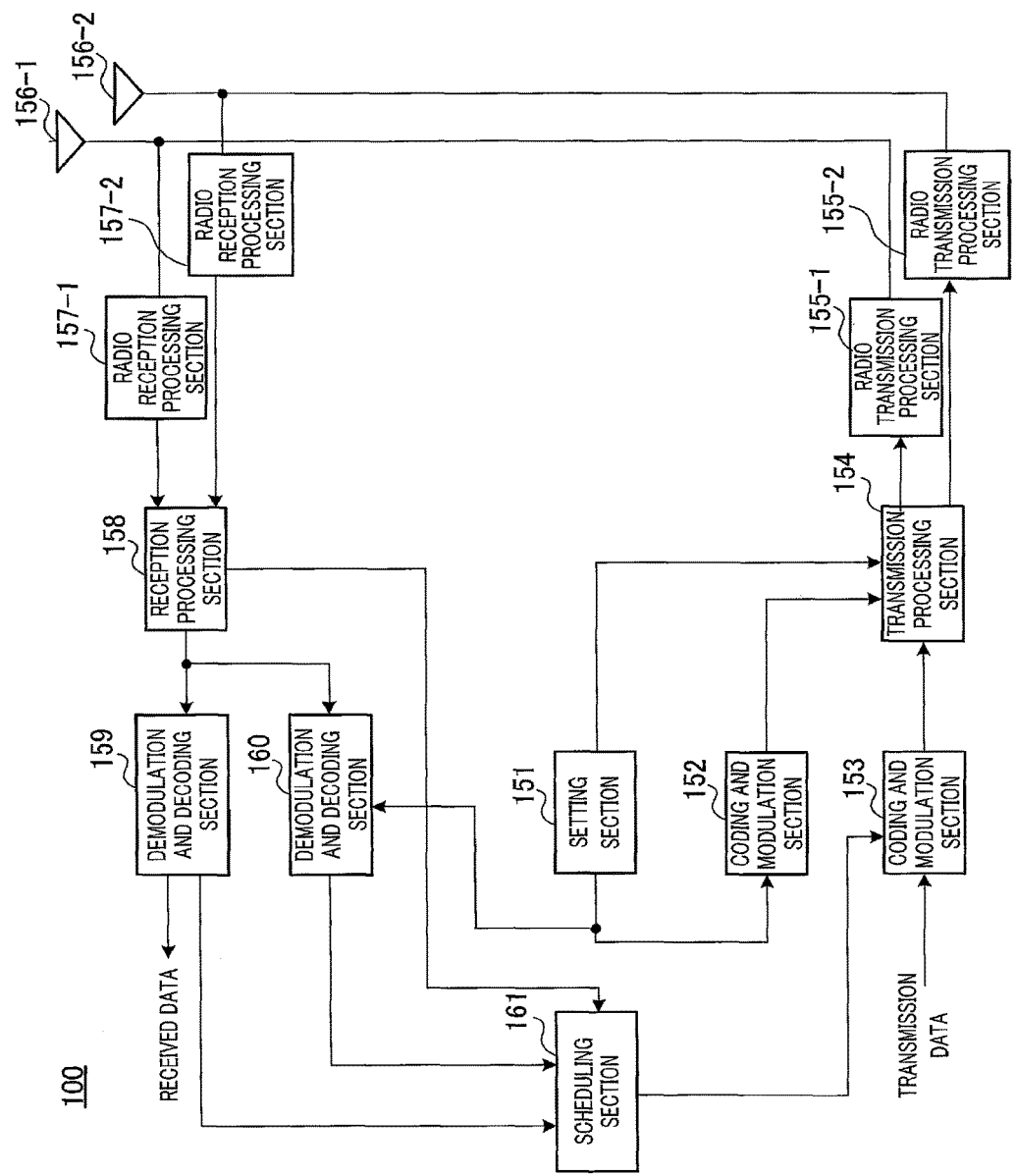
FIG. 5 is a block diagram illustrating a configuration of the base station according to Embodiment 1 of the present invention.
Figure 6:
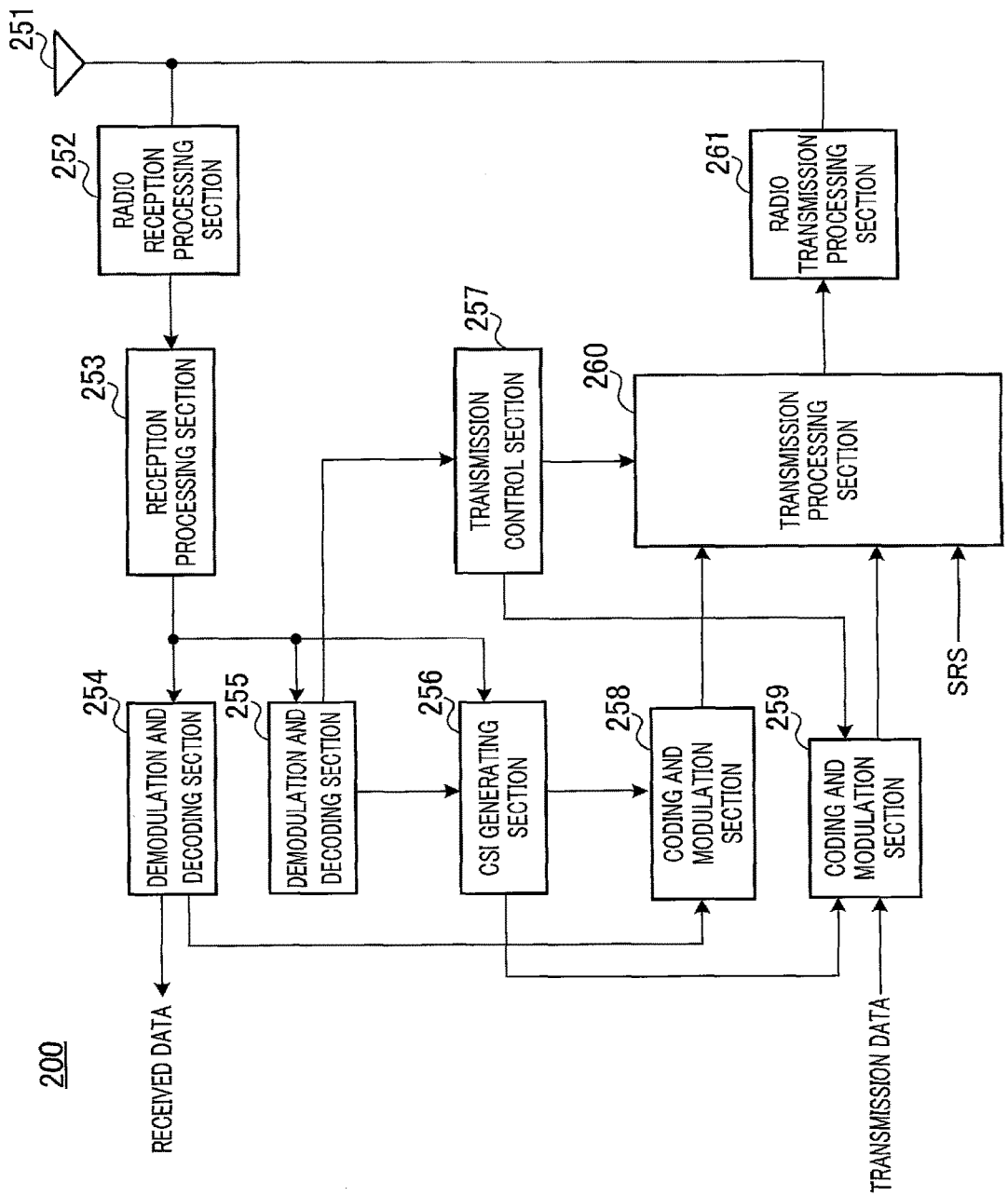
FIG. 6 is a block diagram illustrating a configuration of the terminal according to Embodiment 1 of the present invention.

A communication system according to Embodiment 1 of the present invention includes base station 100 (see FIGS. 3 and 5) and terminal 200 (see FIGS. 4 and 6). Base station 100 is an LTE-A base station and terminal 200 is an LTE-A terminal. LTE-A-compliant radio communication is carried out between base station 100 and terminal 200.

[Main Configuration of Base Station]

FIG. 3 is a block diagram illustrating a main configuration of a base station according to Embodiment 1 of the present invention. Base station 100 shown in FIG. 3 is mainly constructed of control section 120, transmitting section 130 and receiving section 140.

Control section 120 generates information indicating positions or the like of desired signal component measurement resources and interference component measurement resources of CSI-RS (hereinafter referred to as "measurement resource information"). Control section 120 requests that CSI should be reported in aperiodic reporting and also generates trigger information for identifying CSI to be reported by a terminal (hereinafter referred to as "reporting target"). Control section 120 also generates information indicating a reporting target identified by trigger information (hereinafter referred to as "CSI reporting information"). For example, the CSI reporting information is information indicating the association between bits of trigger information and one set of one or a plurality of CSIs as a reporting target. Control section 120 performs scheduling and link adaptation based on CSI or the like.

Transmitting section 130 transmits data signals and CSI-RSs to terminal 200 in subframe units. Transmitting section 130 indicates CSI reporting information and measurement resource information to terminal 200 in advance. When requesting aperiodic reporting, transmitting section 130 transmits trigger information to terminal 200.

Receiving section 140 receives data signals from terminal 200 in subframe units. Receiving section 140 receives CSI reported from terminal 200 at predetermined intervals or after a lapse of a certain period (e.g., after 4 subframes) after transmitting trigger information.

Here, control section 120 performs scheduling and link adaptation assuming that a measured value of the received interference component of CSI will not be updated for a certain period after transmitting CSI-RS using interference component measurement resources or that the received interference component of CSI is measured for CSI-RS transmitted using interference component measurement resources several transmissions (CSI-RS other than the last transmitted CSI-RS) before. To put it more specifically, control section 120 sets MCS (Modulation and Coding Scheme) by taking into account a possibility that a propagation environment may change for a period after the interference component is measured until CSI is generated.

Base station 100 indicates the CSI reporting information and measurement resource information to terminal 200 using, for example, RRC signaling. Base station 100 may also indicate the CSI reporting information and measurement resource information included in a CSI-RS-Config message. Base station 100 may set whether reporting is periodic reporting or aperiodic reporting for terminal 200 which is a CSI reporting target and indicate the set information included in a CQI-ReportConfig message.

[Main Configuration of Terminal]

FIG. 4 is a block diagram illustrating a main configuration of a terminal according to Embodiment 1 of the present invention. Terminal 200 shown in FIG. 4 is mainly constructed of receiving section 220, generation section 230 and transmitting section 240.

Receiving section 220 receives data signals and CSI-RS from base station 100 in subframe units. Before performing CSI reporting, receiving section 220 receives CSI reporting information and measurement resource information in advance from base station 100. Before performing aperiodic reporting, receiving section 220 receives trigger information from base station 100.

After receiving a predetermined interval or trigger information, generation section 230 measures a desired signal component and interference component using CSI-RS resources indicated in the measurement resource information and generates CSI indicated in the CSI reporting information corresponding to the bits of trigger information using the CSI-RS resources indicated in the measurement resource information.

Here, generation section 230 does not measure any interference component for a certain period after receiving trigger information (e.g., for 4 subframes) and measures channel quality using an already measured interference component. For example, generation section 230 measures channel quality using the last measured interference component.

Transmitting section 240 transmits data signals to base station 100 in subframe units. Transmitting section 240 transmits the generated CSI to base station 100.

[Configuration of Base Station]

FIG. 5 is a block diagram illustrating a configuration of the base station according to the present embodiment. As shown in FIG. 5, base station 100 includes setting section 151, coding and modulation sections 152 and 153, transmission processing section 154, radio transmission processing sections 155-1 and 155-2, antennas 156-1 and 156-2, radio reception processing sections 157-1 and 157-2, reception processing section 158, demodulation and decoding sections 159 and 160 and scheduling section 161.

Note that control section 120 in FIG. 3 corresponds to setting section 151 and scheduling section 161 in FIG. 5. Transmitting section 130 in FIG. 3 corresponds to coding and modulation sections 152 and 153, transmission processing section 154 and radio transmission processing sections 155-1 and 155-2 in FIG. 5. Receiving section 140 in FIG. 3 corresponds to radio reception processing sections 157-1 and 157-2, reception processing section 158 and demodulation and decoding sections 159 and 160 in FIG. 5.

Setting section 151 generates measurement resource information. As described above, each resource of CSI-RS is used to measure one of a desired signal component and an interference component for one CSI report. Information on a non zero power CSI-RS resource in the measurement resource information includes parameters such as the number of antenna ports (Antenna Ports Count), CSI-RS configuration number (Resource Config) that identifies subcarrier and OFDM symbol positions in a subframe to which CSI-RS is mapped, transmission subframe (Subframe Config) made up of a transmission cycle and an offset. Information on the zero power CSI-RS resource includes parameters such as a no transmission CSI-RS configuration number list and a transmission subframe.

Setting section 151 generates CSI reporting information. Information for identifying CSI which is a reporting target is set in the CSI reporting information. For example, the CSI reporting information indicates association between the bits of trigger information and one set of one or a plurality of CSIs as a reporting target. Setting section 151 sets CSI reporting information so as to report a plurality of CSIs to each terminal 200 to perform CoMP.

The measurement resource information and CSI reporting information are indicated from base station 100 to terminal 200 using, for example, RRC signaling and shared between base station 100 and terminal 200.

When requesting aperiodic reporting, setting section 151 requests a CSI report, also generates trigger information for identifying a reporting target and outputs the trigger information to coding and modulation section 152 and demodulation and decoding section 160.

Setting section 151 generates downlink resource allocation information which is information indicating resource allocation of PDSCH (Physical Downlink Shared Channel) for each terminal stored in PDCCH (Physical Downlink Control Channel) and outputs the downlink resource allocation information to transmission processing section 154. Setting section 151 also generates uplink resource allocation information which is information indicating PUCCH (Physical Uplink Control Channel) resources and outputs the uplink resource allocation information to coding and modulation section 152 and demodulation and decoding section 160.

Coding and modulation section 152 performs modulation processing on CSI-RS and outputs the modulated CSI-RS to transmission processing section 154. Coding and modulation section 152 performs coding processing and modulation processing on control information such as uplink resource allocation information, trigger information, generates PDCCH and outputs the generated PDCCH to transmission processing section 154. Coding and modulation section 153 performs coding processing and modulation processing on transmission data according to the control of scheduling section 161 and outputs the transmission data to transmission processing section 154.

Transmission processing section 154 maps PDSCH based on the downlink resource allocation information. Transmission processing section 154 maps PDCCH. Transmission processing section 154 then forms a transmission signal through the mapping processing. When the transmission signal is an OFDM signal, transmission processing section 154 maps the modulated signal to resources indicated by the downlink resource allocation information, performs inverse fast Fourier transform (IFFT) processing to transform the modulated signal into a frequency-domain signal, adds a CP (Cyclic Prefix) thereto and thereby forms an OFDM signal.

Radio transmission processing sections 155-1 and 155-2 performs radio transmission processing (up-conversion, digital/analog conversion or the like) on the transmission signal and transmits the transmission signal to terminal 200 via antennas 156-1 and 156-2.

Radio reception processing sections 157-1 and 157-2 perform radio reception processing (down-conversion, analog/digital conversion or the like) on radio signals received via antennas 156-1 and 156-2, and outputs the received signals obtained to reception processing section 158.

Reception processing section 158 extracts PUSCH (Physical Uplink Shared Channel), PUCCH, SRS (Sounding Reference Signal) or the like mapped to resources of the received signals based on the uplink resource allocation information. Reception processing section 158 outputs PUSCH to demodulation and decoding section 159, outputs PUCCH to demodulation and decoding section 160, and outputs SRS to scheduling section 161.

When the received signal is a spatially multiplexed signal, that is, a signal transmitted with a plurality of codewords (CWs), reception processing section 158 demultiplexes the received signal into CWs. On the other hand, when the received signal is an OFDM signal, reception processing section 158 deletes a CP from the received signal, performs fast Fourier transform (FFT) processing on the received signal to transform the signal into a time-domain signal.

Demodulation and decoding section 159 performs demodulation processing and decoding processing on PUSCH and obtains received data and CSI corresponding to aperiodic reporting. Demodulation and decoding section 159 extracts CSI corresponding to aperiodic reporting in a subframe 4 subframes after the subframe in which trigger information is transmitted.

Demodulation and decoding section 160 performs demodulation processing and decoding processing on PDCCH and obtains control information including CSI corresponding to periodic reporting and ACK/NACK. Demodulation and decoding section 160 extracts CSI corresponding to periodic reporting in a defined subframe.

Scheduling section 161 measures receiving quality of the uplink based on SRS, performs scheduling and link adaptation on the uplink and downlink respectively based on the measurement result, CSI and ACK/NACK, and controls coding and modulation section 153.

Here, scheduling section 161 performs scheduling and link adaptation assuming that the measured value of an interference component of the received CSI is not updated for a certain period after transmitting CSI-RS using an interference component measurement resource or that an interference component of the received CSI has been measured with respect to CSI-RS transmitted using an interference component measurement resource several transmissions before (CSI-RS other than the last transmitted CSI-RS). To put it more specifically, scheduling section 161 sets MCS (Modulation and Coding Scheme) by taking into account a possibility that a propagation environment may change for a period after an interference component is measured until CSI is generated.

Note that the present embodiment has adopted the configuration in which a macro cell and a pico cell are formed by a single base station, but a macro cell and a pico cell may be formed of a plurality of base stations and both cells may be made to operate in coordination by sharing appropriate signals.

In the present embodiment, of the plurality of radio transmission processing sections 155-1 and 155-2, antennas 156-1 and 156-2 and radio reception processing sections 157-1 and 157-2, it is possible to use, for example, radio transmission processing section 155-1, radio reception processing section 157-1 and antenna 156-1 to form a macro cell and use radio transmission processing section 155-2, radio reception processing section 157-2 and antenna 156-2 to form a pico cell.

[Configuration of Terminal]

FIG. 6 is a block diagram illustrating a configuration of the terminal according to the present embodiment. As shown in FIG. 6, terminal 200 includes antenna 251, radio reception processing section 252, reception processing section 253, demodulation and decoding sections 254 and 255, CSI generating section 256, transmission control section 257, coding and modulation sections 258 and 259, transmission processing section 260 and radio transmission processing section 261.

Note that receiving section 220 in FIG. 4 corresponds to radio reception processing section 252, reception processing section 253 and demodulation and decoding sections 254 and 255 in FIG. 6. Generation section 230 in FIG. 4 corresponds to CSI generating section 256 and transmission control section 257 in FIG. 6. Transmitting section 240 in FIG. 4 corresponds to coding and modulation sections 258 and 259, transmission processing section 260 and radio transmission processing section 261 in FIG. 6.

Radio reception processing section 252 performs radio reception processing (down-conversion, analog/digital conversion or the like) on a radio signal received via antenna 251 and outputs the received signal obtained to reception processing section 253.

Reception processing section 253 extracts PDCCH mapped to resources of the received signal. Note that when the received signal is an OFDM signal, reception processing section 253 also performs CP removing processing and FFT processing. Reception processing section 253 extracts PDSCH mapped to resources of the received signal based on the downlink resource allocation information. Reception processing section 253 outputs PDSCH to demodulation and decoding section 254 and outputs PDCCH to demodulation and decoding section 255 and CSI generating section 256.

Demodulation and decoding section 254 performs demodulation processing and decoding processing on PDSCH and obtains received data. Demodulation and decoding section 254 performs error detection processing on the received data and outputs ACK/NACK corresponding to the error detection result to coding and modulation section 258.

Demodulation and decoding section 255 performs demodulation processing and decoding processing on PDCCH and obtains control information such as uplink resources allocation control information and trigger information. Demodulation and decoding section 255 outputs the trigger information to CSI generating section 256 and outputs the uplink resources allocation control information to transmission control section 257.

After a predetermined interval or reception of trigger information, CSI generating section 256 measures a desired signal component of a non zero power CSI-RS resource and an interference component of a zero power CSI-RS resource indicated in measurement resource information and measures channel quality (e.g., SINR) based on the desired signal component and the interference component. Upon receiving trigger information, in order to generate CSI indicated in CSI reporting information corresponding to the trigger information bit, CSI generating section 256 measures a desired signal component of a non zero power CSI-RS resource indicated in the measurement resource information and an interference component of the zero power CSI-RS resource, and measures channel quality (e.g., SINR) based on the desired signal component and the interference component. CSI generating section 256 generates CSI based on the measurement result, outputs CSI corresponding to periodic reporting to coding and modulation section 258 and outputs CSI corresponding to aperiodic reporting to coding and modulation section 259.

Here, CSI generating section 256 does not measure any interference component for a certain period (e.g., for 4 subframes) after receiving the trigger information and measures channel quality from the measured interference component using an already measured interference component, for example, resources transmitted in the past corresponding to one transmission at a CSI-RS transmission interval.

Transmission control section 257 identifies a resource to which the transmission signal is mapped based on the uplink resources allocation control information and outputs mapping resource information indicating this resource to transmission processing section 260. Transmission control section 257 also outputs MCS information included in the uplink resources allocation control information to coding and modulation section 259.

Coding and modulation section 258 performs coding processing and modulation processing on ACK/NACK and CSI corresponding to periodic reporting and outputs PUCCH to transmission processing section 260. Coding and modulation section 259 performs coding processing and modulation processing on the transmission data and CSI corresponding to aperiodic reporting based on the MCS information and outputs PUSCH to transmission processing section 260.

Transmission processing section 260 maps PUSCH, PUCCH and SRS based on the mapping resource information and forms a transmission signal. Here, when the transmission signal is an OFDM signal, the transmission processing section maps the modulated signal to a resource indicated in the downlink resource allocation information, performs IFFT processing to transform the signal into a frequency-domain signal, and adds a CP to thereby form an OFDM signal. In the case of non-MIMO transmission, the transmission processing section generates a transmission signal using one codeword (CW) and in the case of MIMO transmission, the transmission processing section generates a transmission signal using two codewords.

Radio transmission processing section 261 performs radio transmission processing (up-conversion, digital/analog conversion or the like) on the transmission signal and transmits a radio signal to base station 100 via antenna 251.

[Specific Example of CSI Generating Method]

Figure 7:
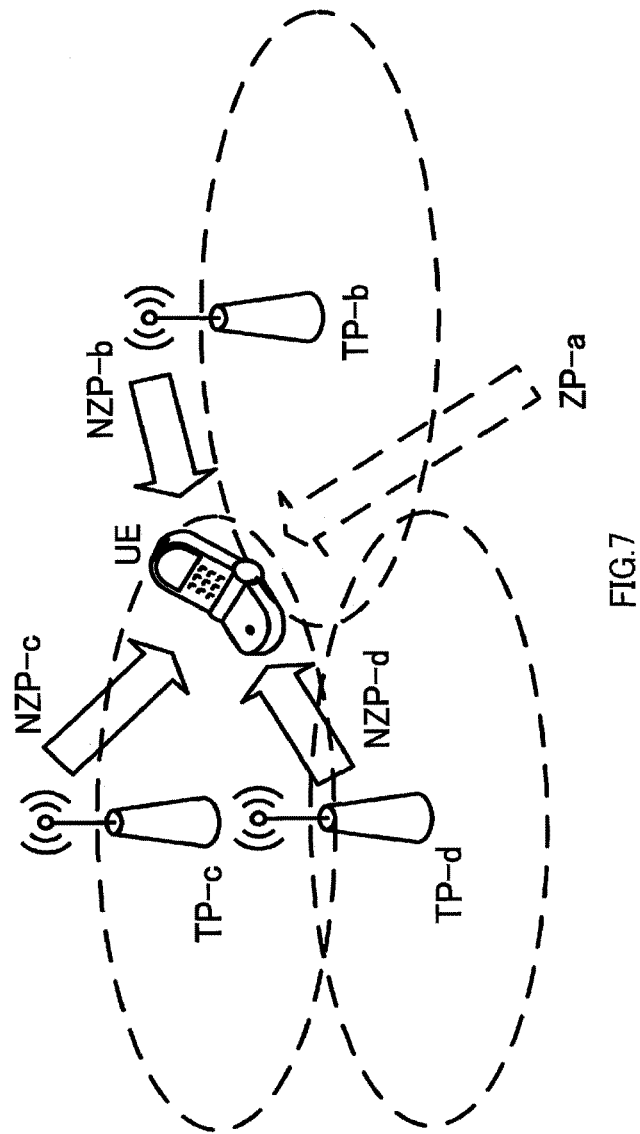
FIG. 7 illustrates an example of a communication system according to Embodiment 1 of the present invention.

Next, a specific example of the method for generating CSI by terminal 200 according to the present embodiment will be described with reference to FIG. 7 and FIG. 8. An example in FIG. 7 illustrates a case where a terminal (UE) is communicating with three base stations (TP-b, TP-c and TP-d) according to CoMP. In FIG. 7, a desired signal component measurement resource of base station TP-b is represented by NZP-b, a desired signal component measurement resource of base station TP-c is represented by NZP-c, and a desired signal component measurement resource of base station TP-d is represented by NZP-d. In FIG. 7, an interference component measurement resource of a base station not included in CoMP is represented by ZP-a.

Figure 8:
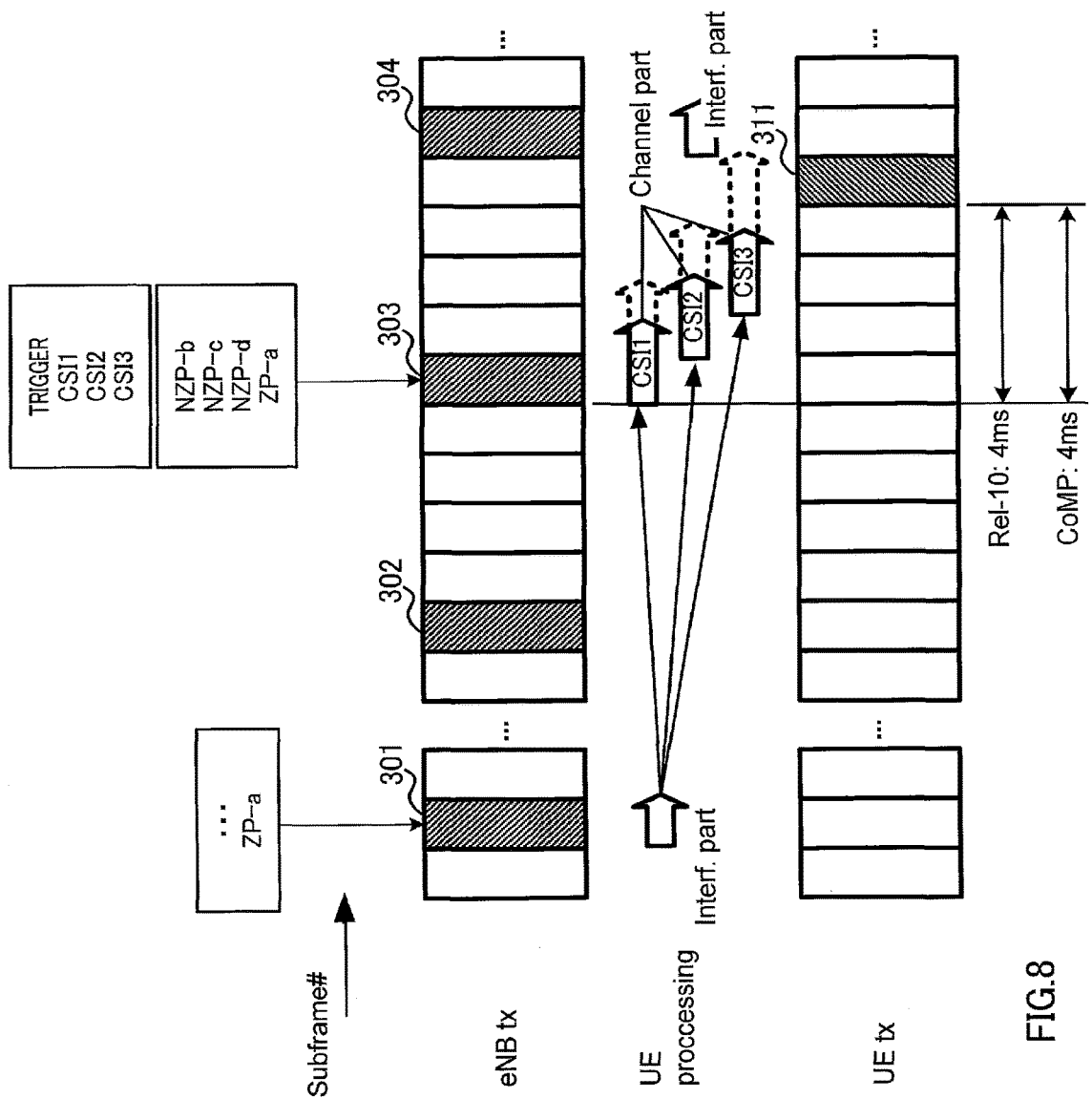
FIG. 8 illustrates a method of generating CSI by the terminal according to Embodiment 1 of the present invention.

FIG. 8 illustrates subframes (eNB tx) transmitted by coordinating base stations (TP-b, TP-c and TP-d), a CQI generation process (UE processing) performed by a terminal (UE) and subframes (UE tx) transmitted by the terminal (UE).

In the case of FIG. 8, subframe 301 includes at least ZP-a and subframe 303 includes NZP-b, NZP-c, NZP-d and ZP-a. ZP-a is not included in subframes 302 and 304. The coordinating base stations (TP-b, TP-c and TP-d) transmit trigger information for instructing the terminal (UE) to report all CSIs (CSI1, CSI2 and CSI3) in subframe 303. Note that CSI1 is CSI corresponding to base station TP-b, CSI2 is CSI corresponding to base station TP-c, and CSI and CSI3 are CSIs corresponding to base station TP-d.

In this case, in a stage in which the terminal (UE) receives subframe 301, the terminal (UE) measures an interference component using ZP-a in advance. Furthermore, in subframe 303, the terminal (UE) does not measure any interference component for a certain period (4 subframes up to subframe 311 in FIG. 8) after receiving trigger information.

Upon receiving the trigger information, the terminal (UE) measures a desired signal component using NZP-b, NZP-c and NZP-d, measures channel quality using these resources and the interference component measured in advance, generates CSIs (CSI1, CSI2 and CSI3) indicating the measurement result and reports the CSIs in subframe 311. After that, the terminal (UE) measures the interference component using ZP-a included in subframe 303.

As a result, the present embodiment can reduce the amount of processing required to generate one CSI compared to Release10 and reduce the time to generate each CSI. The present embodiment can also advance the timing of starting pipeline processing to generate CSI, and can thereby advance the completion of the processing all the more for CSIs generated in later stages of the pipeline. In FIG. 8, the amount of processing (time) to generate CSI in CoMP is shown by a solid line arrow and the amount of processing (time) to generate CSI in Release10 is shown by a dotted line arrow.

By this means, the present embodiment can process three or more CSIs for a period (4-subframe period) defined in Release10.

[Effects]

As described above, according to the present embodiment, it is possible to generate a plurality of (3 or more in the present embodiment) CSIs within a period predefined in Release10 by using an interference component measured in advance and thereby realize CoMP control that flexibly switches between base stations. Since the interference component has a large allowable delay, using an interference component measured in advance will not cause the accuracy of CSI to significantly deteriorate.

According to the present embodiment, since the base station knows that the terminal generates CSI using an interference component measured in advance, it is possible to set MCS by taking into account the possibility that the propagation environment may change for a period after an interference component is measured until CSI is generated.

Embodiment 2

[Overview]

Figure 9:
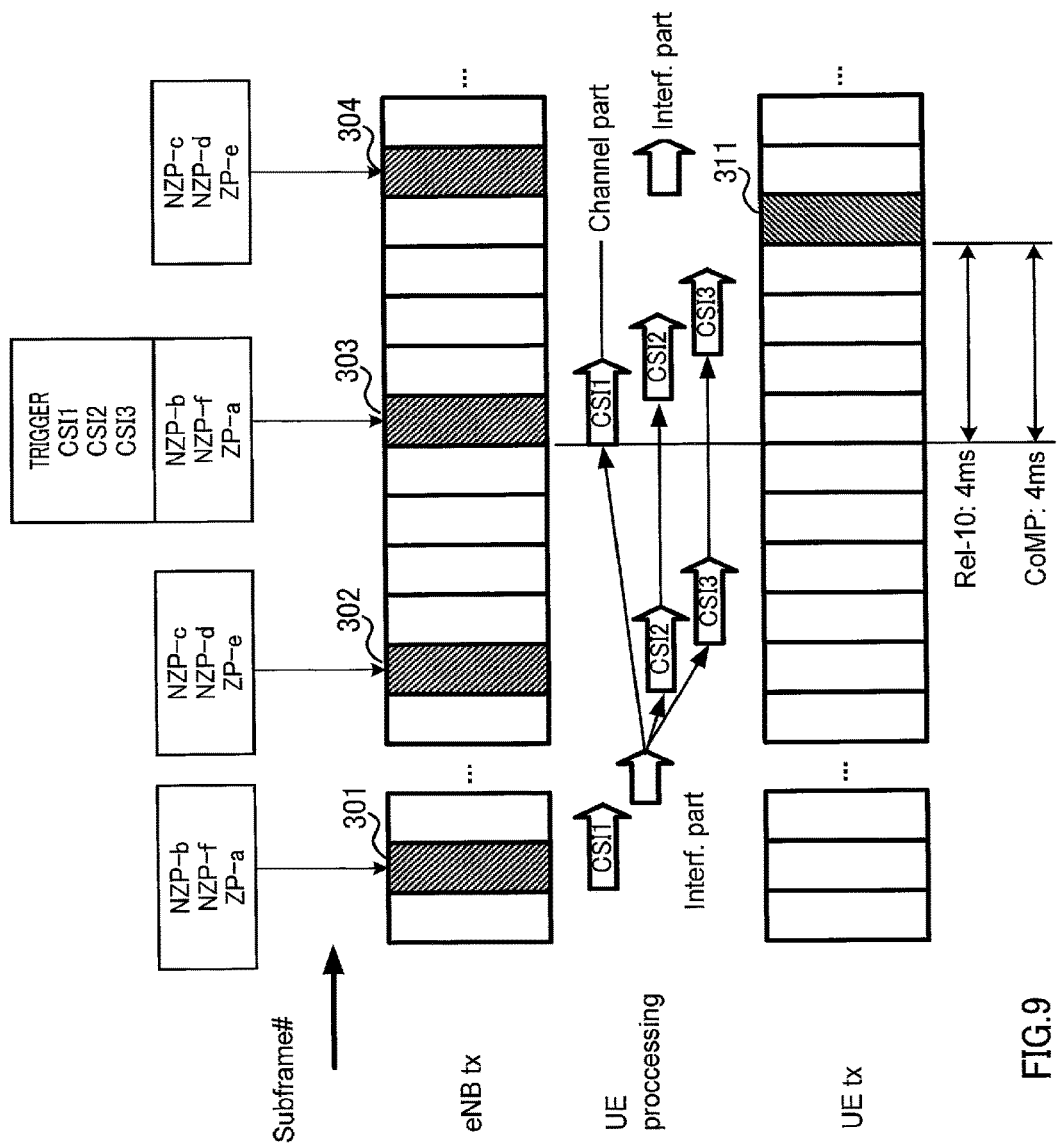
FIG. 9 illustrates a method of generating CSI by a terminal according to Embodiment 2 of the present invention.

Embodiment 2 will describe a method of generating CSI when there is a constraint that only up to two non zero power CSI-RS resources can be arranged in one subframe with reference to FIG. 7 and FIG. 9. The configurations of a base station and a terminal in the present embodiment are the same as those shown in FIG. 3 to FIG. 6.

As in the case of FIG. 8, FIG. 9 illustrates subframes (eNB tx) transmitted by coordinating base stations (TP-b, TP-c, TP-d), a CQI generation process (UE processing) executed by a terminal (UE) and subframes (UE tx) transmitted by the terminal (UE).

In the case of FIG. 9, subframes 301 and 303 include NZP-b, NZP-f and ZP-a and subframes 302 and 304 include NZP-c, NZP-d and ZP-e. In subframe 303, coordinating base stations (TP-b, TP-c and TP-d) transmit trigger information for instructing the terminal (UE) to report all CSIs (CSI1, CSI2 and CSI3). ZP-e and NZP-f are resources used in other terminals. The terminal (UE) need not measure any desired signal component or interference component using ZP-e and NZP-f.

In this case, in the stage of receiving subframe 301, the terminal (UE) measures an interference component in advance using ZP-a. In subframe 303, the terminal (UE) does not measure any interference component for a certain period (4 subframes up to subframe 311 in FIG. 8) after receiving trigger information.

In the stage of receiving subframes 301 and 303, the terminal (UE) measures a desired signal component using NZP-b and then measures an interference component using ZP-a. Upon receiving trigger information, the terminal (UE) measures channel quality using a desired signal component newly measure using NZP-b at the timing and an interference component measured in advance and generates CSI1.

In the stage of receiving subframes 302 and 304, the terminal (UE) measures a desired signal component using NZP-c and NZP-d, measures channel quality using this desired signal component and an interference component measured in advance and generates CSI2 and CSI3. Upon receiving trigger information, the terminal (UE) uses CSI2 and CSI3 generated in the stage of receiving subframe 302 and reports CSI1, CSI2 and CSI3 in subframe 311.

Thus, in the present embodiment, even when there is a constraint that only up to two non zero power CSI-RS resources can be arranged in one subframe, three or more CSIs can be simultaneously processed within a period (4-subframe period) defined in Release10.

[Effects]

As described above, according to the present embodiment, even when there is a constraint on non zero power CSI-RS resources (up to two resources in the present embodiment) that can be arranged in one subframe, a plurality of (three or more in the present embodiment) CSIs can be generated within a period defined in Release10, and it is thereby possible to realize CoMP control that flexibly switches between base stations. When reporting CSI, the present embodiment can substitute some of CSIs with those generated in advance, and can thereby reduce the amount of calculation compared to Embodiment 1. Note that the desired signal component used to generate CSIs as substitutes is measured within a range of allowable delays. For this reason, even when a desired signal component is measured in advance, this will not cause the accuracy of CSI to deteriorate significantly.

Embodiment 3

[Specific Example of CSI Generating Method]

Depending on a propagation environment or traffic situation, occupying resources possessed by all coordinating base stations by one terminal may not always be the best. Transmitting a signal from some of the coordinating base stations to another terminal may result in an improved throughput of the entire cell or satisfy the allowable delay in the base stations.

Figure 10:
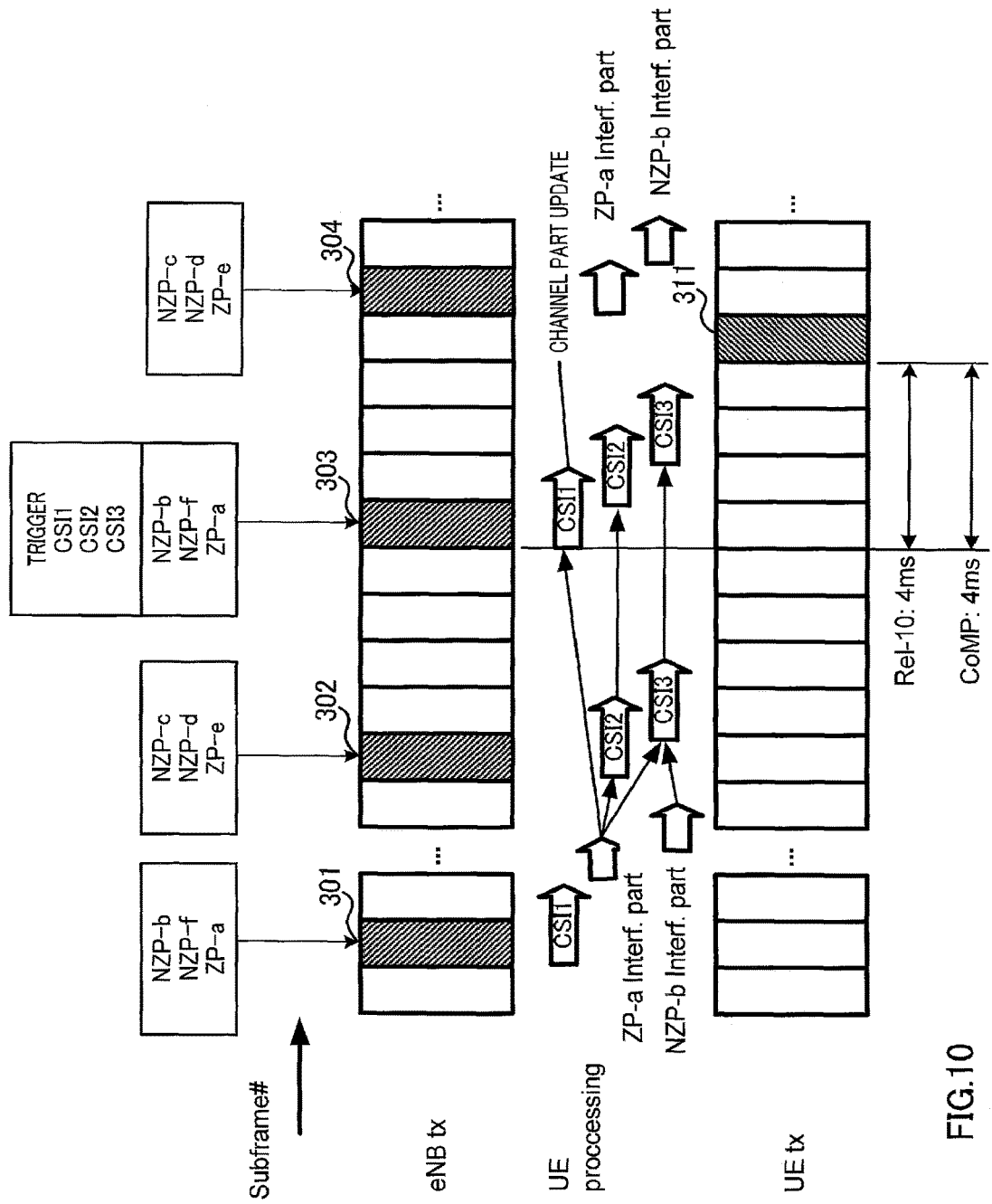
FIG. 10 illustrates a method of generating CSI by a terminal according to Embodiment 3 of the present invention.

In view of this aspect, Embodiment 3 will describe a method of generating CSI when a base station instructs a terminal to use resources used to measure a desired signal component in reporting of one CSI to also measure an interference component in reporting of other CSIs with reference to FIG. 7 and FIG. 10. That is, in the present embodiment, resources used to measure a desired signal component of CSI and resources used to measure an interference component of another CSI are the same. The configurations of a base station and a terminal in the present embodiment are the same as those shown in FIG. 3 to FIG. 6. In the present embodiment, as in the case of Embodiment 2, there is a constraint that only up to two non zero power CSI-RS resources can be arranged in one subframe.

As in the case of FIG. 8 and FIG. 9, FIG. 10 shows subframes (eNB tx) transmitted by coordinating base stations (TP-b, TP-c and TP-d), CQI generation process (UE processing) executed by a terminal (UE) and subframes (UE tx) transmitted by the terminal (UE).

In the case of FIG. 10 as in the case of FIG. 9, subframes 301 and 303 include NZP-b, NZP-f and ZP-a and subframes 302 and 304 include NZP-c, NZP-d and ZP-e. The coordinating base stations (TP-b, TP-c and TP-d) transmit trigger information for instructing the terminal (UE) to report all CSIs (CSI1, CSI2 and CSI3) in subframe 303.

In FIG. 10, the coordinating base stations (TP-b, TP-c and TP-d) instruct the terminal (UE) to use NZP-b to measure a desired signal component in CSI1 and to measure an interference component in CSI3.

In this case, upon reception of subframe 301, the terminal (UE) measures an interference component using ZP-a and NZP-b in advance. The terminal (UE) does not measure any interference component for a certain period (4 subframes up to subframe 311 in FIG. 8) after receiving trigger information in subframe 303.

In the stage of receiving subframes 301 and 303, the terminal (UE) measures a desired signal component using NZP-b and then measures an interference component. Upon receiving trigger information, the terminal (UE) measures channel quality using a desired signal component newly measured using NZP-b at the timing and the interference component measured using ZP-a in advance, and generates CSI1.

In the stage of receiving subframes 302 and 304, the terminal (UE) measures a desired signal component using NZP-c and measures channel quality using the interference component measured using ZP-a in advance, and generates CSI2. In the stage of receiving subframes 302 and 304, the terminal (UE) measures a desired signal component using NZP-d and measures channel quality using this desired signal component and the interference component measured using ZP-a and NZP-b in advance, and generates CSI3. Upon receiving trigger information, the terminal (UE) reports CSI1, CSI2 and CSI3 in subframe 311 using CSI2 and CSI3 measured in the stage of receiving subframe 302.

Thus, in the present embodiment, even in a case where the terminal is instructed to use resources used to measure a desired signal component in reporting of one CSI to also measure an interference component in reporting of another CSI, it is possible to simultaneously process three or more CSIs within a period (4-subframe period) defined in Release10.

[Effects]

As described above, according to the present embodiment, even in a case where the terminal is instructed to use resources used to measure a desired signal component in reporting of one CSI to also measure an interference component in reporting of another CSI, it is possible to simultaneously process a plurality of (three or more in the present embodiment) CSIs within a period defined in Release10 and realize CoMP control that flexibly switches between base stations as in Embodiments 1 and 2. According to the present embodiment, when generating CSI, it is possible to substitute some of desired signal components with those measured in advance, and thereby reduce the amount of calculation compared to Embodiment 1. Note that since the desired signal component measured in advance is measured when receiving the last CSI-RS, channel quality is measured within a range of allowable delays of the desired signal component. For this reason, even when the desired signal component is measured in advance, this will not cause the accuracy of CSI to deteriorate significantly.

Each embodiment of the present invention has been described thus far.

In the foregoing embodiments, the present invention is configured with hardware by way of example, but the invention may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

As described above, a radio communication terminal apparatus according to the embodiments includes: a generation section that generates CSI (Channel State Information) using a desired signal component and an interference component; and a transmitting section that transmits the CSI, in which when receiving trigger information that requests a CSI report and generating the CSI, the generation section uses an interference component measured before receiving the trigger information.

In the radio communication terminal apparatus according to the embodiments, when receiving the trigger information and generating the CSI, the generation section uses a desired signal component measured after receiving the trigger information.

In the radio communication terminal apparatus according to the embodiments, the generation section measures a desired signal component and an interference component using a resource indicated by resource information, in which the resource information indicates a resource to which a reference signal is mapped.

In the radio communication terminal apparatus according to the embodiments, when no resource exists for measuring a desired signal component of CSI to be reported in a subframe received at timing at which the trigger information is received, the generation section uses a desired signal component of CSI to be reported that is measured before receiving the trigger information.

In the radio communication terminal apparatus the embodiments, when a resource used to measure a desired signal component of CSI and a resource used to measure an interference component of another CSI are the same, the generation section measures a desired signal component using the resource after receiving the trigger information and measures an interference component using the interference component measured using the resource before receiving the trigger information.

A radio communication base station apparatus according to the embodiments includes: a transmitting section that transmits resource information indicating a resource to which a reference signal is mapped and trigger information requesting a CSI report; and a receiving section that receives CSI (Channel State Information) generated based on a desired signal component and an interference component measured using the resource for the trigger information, in which the CSI is generated based on an interference component measured before transmitting the trigger information.

In the radio communication base station apparatus according to the embodiments, the CSI is generated based on a desired signal component measured after transmitting the trigger information.

A CSI generating method according to the embodiments includes: measuring a desired signal component and an interference component; and generating CSI (Channel State Information) using the desired signal component and the interference component, in which, when trigger information requesting a CSI report is received and the CSI is generated, an interference component measured before receiving the trigger information is used.

The disclosure of the specification, drawings and abstract in Japanese Patent Application No. 2012-173036 filed on Aug. 3, 2012 is incorporated herein by reference in its entirety.

INDUSTRIAL APPLICABILITY

The present invention is applicable to a mobile communication system which performs CoMP and in which a radio communication terminal apparatus reports CSI to a radio communication base station apparatus.

REFERENCE SIGNS LIST

100 Base station
120 Control section
130 Transmitting section
140 Receiving section
151 Setting section
152, 153 Coding and modulation section
154 Transmission processing section
155-1, 155-2 Radio transmission processing section
156-1, 156-2 Antenna
157-1, 157-2 Radio reception processing section
158 Reception processing section
159, 160 Demodulation and decoding section
161 Scheduling section
200 Terminal
220 Receiving section
230 Generation section
240 Transmitting section
251 Antenna
252 Radio reception processing section
253 Reception processing section
254, 255 Demodulation and decoding section
256 CSI Generating section
257 Transmission control section
258, 259 Coding and modulation section
260 Transmission processing section
261 Radio transmission processing section

The invention claimed is:

1. A radio communication terminal apparatus, comprising:
generation circuitry, which, in operation, generates CSI (Channel State Information) using a desired signal component and an interference component; and
a transmitter, which, in operation, transmits the CSI, wherein
the generation circuitry, in operation, measures the desired signal component and the interference component using a resource indicated by resource information, the resource information indicating a resource to which a reference signal is mapped, and
when receiving trigger information that requests a CSI report and generating the CSI, when no resource exists for measuring a desired signal component of CSI to be reported in a subframe, the generation circuitry, in operation, uses a desired signal component of CSI to be reported that is measured before receiving the trigger information.

2. The radio communication terminal apparatus according to claim 1, wherein when receiving trigger information that requests a CSI report and generating the CSI, the generation circuitry, in operation, uses an interference component measured before receiving the trigger information.

3. The radio communication terminal apparatus according to claim 1, wherein, when a resource used to measure a desired signal component of CSI and a resource used to measure an interference component of another CSI are the same, the generation circuitry, in operation, measures the desired signal component using the resource after receiving the trigger information and uses the interference component measured using the resource before receiving the trigger information.

4. A CSI generating method comprising:
measuring a desired signal component and an interference component, using a resource indicated by resource information, wherein the resource information indicates a resource to which a reference signal is mapped;
generating CSI (Channel State Information) using the measured desired signal component and the measured interference component; and
transmitting the CSI, wherein when trigger information requesting a CSI report is received and the CSI is generated and when no resource exists for measuring a desired signal component of CSI to be reported in a subframe, using a desired signal component of CSI to be reported that is measured before receiving the trigger information.

5. The CSI generating method according to claim 4, wherein when receiving trigger information that requests a CSI report, the generating the CSI comprises using an interference component measured before receiving the trigger information.

6. The CSI generating method according to claim 4, wherein, when a resource used to measure a desired signal component of CSI and a resource used to measure an interference component of another CSI are the same, the generating the CSI comprises measuring the desired signal component using the resource after receiving the trigger information and using the interference component measured using the resource before receiving the trigger information.

* * * * *